United States Patent [19]

Lang

[11] Patent Number: 4,810,317

[45] Date of Patent: Mar. 7, 1989

[54] METHOD FOR PREVENTING SIDE WALL INDENTATIONS IN A SPLICE REGION OF THE TIRE CARCASS

[75] Inventor: Bruno Lang, Ballwil, Switzerland

[73] Assignee: Viscosuisse SA., Emmerbrücke, Switzerland

[21] Appl. No.: 27,489

[22] Filed: Mar. 17, 1987

[30] Foreign Application Priority Data

Mar. 20, 1986 [CH] Switzerland .................. 01126/86
Sep. 5, 1986 [CH] Switzerland .................. 03575/86

[51] Int. Cl.⁴ .................................... B29D 30/06
[52] U.S. Cl. ............................ 156/134; 152/548
[58] Field of Search ............... 156/134, 133, 304.5, 156/308.4, 157, 158, 304.3; 152/538, 548, 560, 563

[56] References Cited

U.S. PATENT DOCUMENTS

| | | |
|---|---|---|
| 1,918,553 | 7/1933 | Musselman .................. 152/548 |
| 3,414,447 | 12/1968 | Travers ..................... 152/560 X |
| 3,451,461 | 6/1969 | Wittneben ................... 152/538 |
| 3,581,793 | 6/1971 | Wittneben ................. 152/560 X |
| 3,612,135 | 10/1971 | Wittneben ................. 152/548 X |
| 3,690,363 | 9/1972 | Guyot ...................... 152/560 X |
| 4,185,675 | 1/1980 | Greiner et al. ............. 152/560 X |
| 4,466,473 | 8/1984 | Matyja et al. .............. 156/134 X |
| 4,733,709 | 3/1988 | Lambillote et al. .......... 156/134 X |

FOREIGN PATENT DOCUMENTS

0117137 8/1984 European Pat. Off.
56-99804 8/1981 Japan ......................... 156/134

Primary Examiner—Michael W. Ball
Assistant Examiner—Ramon R. Hoch
Attorney, Agent, or Firm—Michael J. Striker

[57] ABSTRACT

A method for prevention wall indentations in a splice region of the tire carcass by joining two cut edges of the tire carcass and applying to the splice region a splice tape which overlaps the cut edges of the carcass.

7 Claims, 2 Drawing Sheets

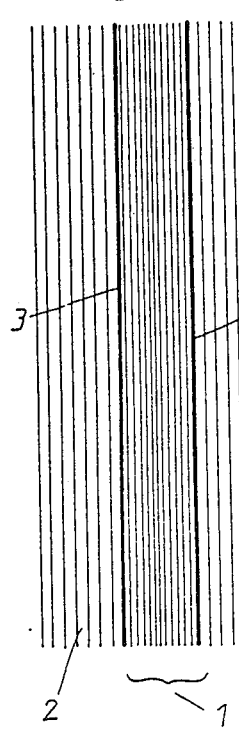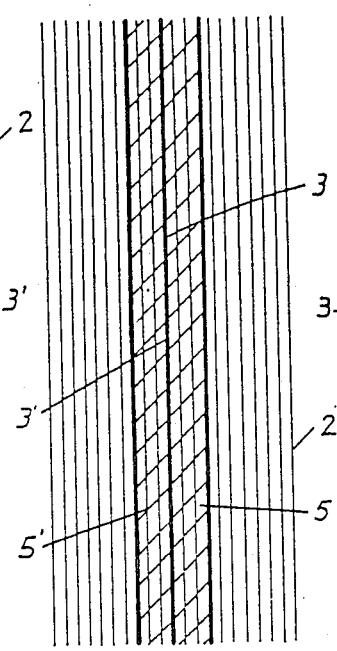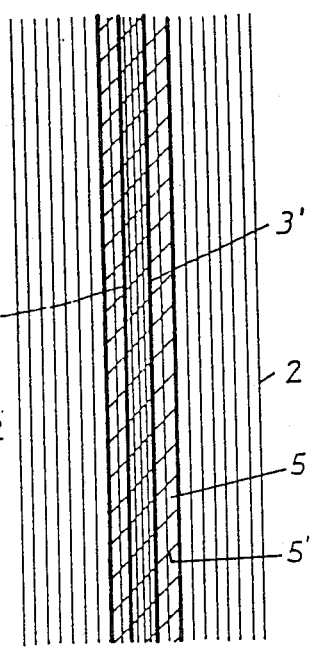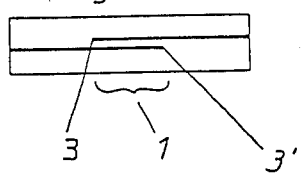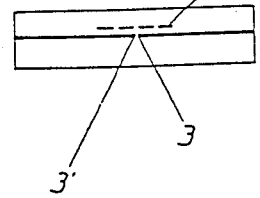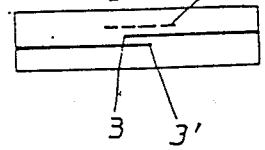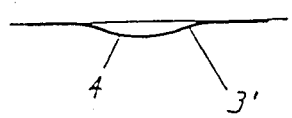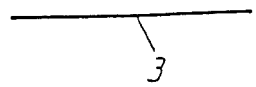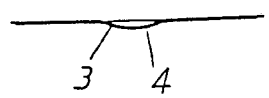

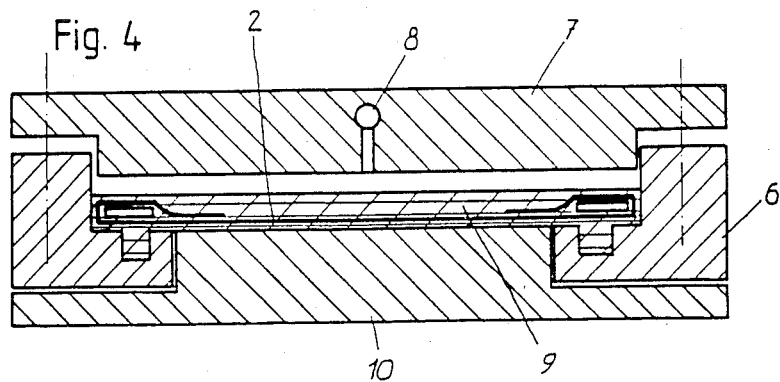
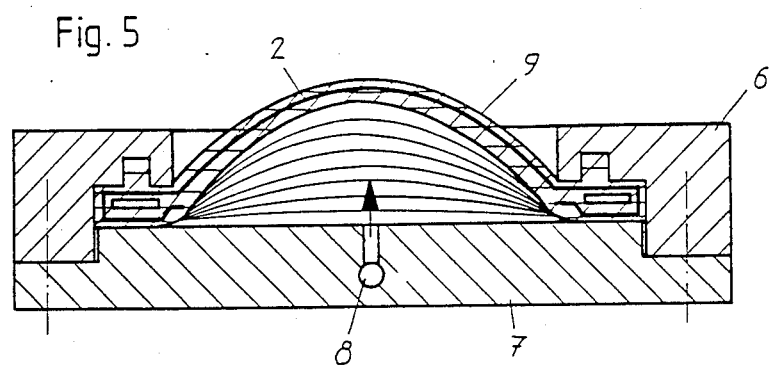
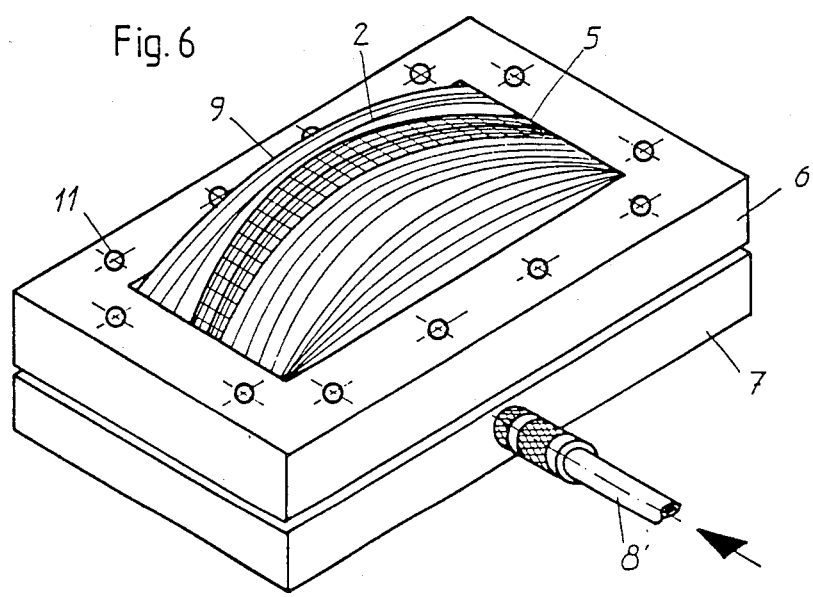

METHOD FOR PREVENTING SIDE WALL INDENTATIONS IN A SPLICE REGION OF THE TIRE CARCASS

BACKGROUND OF THE INVENTION

The invention relates to a method for preventing sidewall indentations in the splice area between two ends of a tire carcass and to a device for making and testing tire carcass splice samples and for measuring side wall indentations occuring therein during the inflating of the tire.

With conventional vehicle tires the splice regions defined at the connection of the ends transversal to the cords of the tire carcass fabric are secured by more or less cord overlapping of the edges of the carcass. However due to this technique the tire carcass can be disturbed and thermal shrinkage behaviour in the region of overlapping cords may occur during the inflation of the tire. The carcass fabric with high thermal shrinkage could therefore, when removed from the curing or vulcanizing mold, have considerable shrinkage in the splice region, which would result in side wall indentations in the tire.

The use of the carcass fabric of polyester, Nylon or Rayon with low shrinkage values would provide dimension-stable tires. However with operating pressure of 2 bars or under the influence of the sunlight or during the treatment of the car in a paint-baking oven, the carcass expansion value would be up to 50% lower at the splice, as compared to the normal tire carcasses. This difference will definitely show up in an increased sidewall indentation.

One of conventional methods of the type under discussion has been disclosed in U.S. Pat. No. 4,466,473. With this known method, the carcass cords of one side of the overlapping carcass splice are cut at uniform intervals from each other and the disturbing effect of shrinkage and elongation is substantially reduced. The disadvantage of this known method resides in that the cutting of the cords of the carcass fabric and the making of the splices at the splice table as well as later on the tire building stand can only be achieved with a great effort.

It is also not very simple to ensure the depth of the cut during the cutting of the cords when the carcass cut edge does not run straight to the cords of the carcass. There is also the danger that the incised cords would not precisely lie under the cords of the other carcass half during the splicing process, and weak spots would result.

SUMMARY OF THE INVENTION

It is an object of the present invention to provide an improved method of preventing sidewall indentations in a splice region of the tire carcass.

It is another object of this invention to provide a device for an effective and fast making and testing of tire carcass splice specimens.

These and other objects of the invention are attained by a method for preventing wall indentations in a splice region of tire carcasses, comprising the steps of joining together of calendered cords of a tire carcass at cut edges of the carcass in said splice region; and providing at least one splice tape overlapping the cut edges.

The splice tape has calendered warp threads which extend at an angle 0° to 90° to the cords of the carcass. This angle may be preferably 0° and 45°, particularly between 10° and 25°. Thereby the cords of the carcass lying under the splice tape would enable a homogeneous cord distribution and prevent a non-permissible moving of the cuts away from each other.

The cut edges may be in contact with each other in the splice region.

The cut edges carcass may overlap each other in the splice region by a very small distance.

The cut edges may overlap each other by 1 to 5 cords without causing indentations which are detrimental to the splice regions in the side walls of the tire.

With an overlap of more than 2 cords, wall indentations are optically detectable.

The splice tap may be formed of parallel calendered warp threads.

It is advisable to make a rubberized splice tape in advance and then apply it to the splice region.

The cut edges of the calendered cords of the tire carcass which is to be spliced can abut each other, in accordance with the modified embodiment, as tightly as possible and then be covered with the splice tape and afterwards vulcanized in such a position. The advantage of this method is that no dublication of the modulus and the shrinkage can occur at that position, in case of overlapping of the carcass cords.

The advantage of the manufacturing of the splice tape from rubber-made parallel calendered warp threads resides in that these threads extend over the splice at a small angle to the cords of the carcass. In this fashion, the abutting or slightly overlapping cut edges of the carcass are better held together during the inflation of the green tire, and it is ensured that opening up and slipping off of the cut edges during the inflation would be avoided.

In addition to making the splice tape of cord fabric, knitted fabric or pleated fabric the splice tape can be produced of the flat fabric in which warp threads have a higher rigidity than weft threads. It is also expedient that the warp threads of the splice tape be as alike as possible to the cords of the carcass but lie in the lower initial modulus. Preferably the initial modulus should be by about 50% lower than the initial modulus of the carcass cords.

The warp threads of the splice tape have an initial modulus which is lower than that of the cords of the carcass and with a thermal shrinkage which is at most 3% of that of the carcass. Thus weft threads of the splice tape may have an expansion in the region of cords of the carcass. It is expedient to use an expandable and weak filling yarn to avoid high elongations. The utilization of the filling yarn-free splice tape is also advantageous because during the inflation of the tire the cords would be distributed in the region of the splice more uniformaly.

The splice tape may be at least 5 mm and at most 100 mm wide, preferably 10 to 30 mm.

The warp threads of the splice tape can be formed preferably of the threads having lower modulus than those of the carcass. Thus Nylon 6.6 with the carcass of polyester is particularly suitable. The splice tape can be also made of synthetic yarns, such as low-modulus adhesive, fatigue-resistant, thermoplastic yarns. The splice tape may be made of polyamid.

The splice tape may be made of the same rubber as the tire but have an inner air-impermeable layer of rubber.

For the manufacturing and testing splice samples made from the carcass fabric to be tested, a device is suggested herein, which comprises a frame for receiving a carcass splice specimen; a cover; and a bottom plate. The cover covers the device gas-tightly at the pressure up to 5 bar.

The bottom plate can be curved for the manufacturing of the splice specimens. For the application of pressure gas or fluid a connection is provided at the front side of the cover.

Splices can be simulated and directly tested with the mold according to the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1a is a schematic top plane view of the portion of the splice region of the tire carcass of the prior art;

FIG. 1b is a schematically shown section through the splice region of the tire carcass of FIG. 1a;

FIG. 1c is a schematic side view of an indentation in the splice region of the test sample of the tire of the prior art, in the inflated condition;

FIG. 2a is a schematic top plan view of the portion of the splice region of the carcass with adjacent warp threads and a splice tape according to the invention;

FIG. 2b is schematic section of the carcass splice region of FIG. 2a;

FIG. 2c is a schematic side view of the indentation in the speciman or tire carcass of the invention;

FIG. 3a is a schematic top plan view of a modified embodiment with overlapping warp threads and the splice tape;

FIG. 3b is a schematic sectional view of FIG. 3a;

FIG. 3c is a schematic view similar to that of FIG. 2c but of the embodiment of FIG. 3a, in the inflated condition;

FIG. 4 is a schematic sectional view through a testing device in a vulcanized condition, in which the cover can be curved to be dome-shaped;

FIG. 5 is a view of the device of FIG. 4 in the testing position; and

FIG. 6 is a perspective view of the testing device in the condition of testing.

DETAILED DESCRIPTION OF THE PREFERRED EMBODIMENTS

Referring now to the drawings in detail, and firstly to FIGS. 1a, 1b and 1c, reference numeral 1 designates a splice region. A plurality of cords 2 of the carcass extend parallel to each other and are vulcanized in this position.

FIG. 1b shows the overlapping of cut edges 3 and 3' in the region of the splice 1 whereby about five cords 2 of both carcass ends overlap each other.

FIG. 1c schematically shows a splice side wall in a inflated prior art at the testing pressure of about 2 bar. An indentation 4 of 0.5 or more mm is readily observable in the area of about five overlapping cords FIG. 2a shows cut edges 3 and 3' which in the embodiments of the present invention either slightly overlap each other or are in end-to-end contact with each other. A rubber splice tape 5 with obliquely extending warp threads 5' is laid on one or both sides over the cut edges 3, 3' and the splice region is vulcanized. The width of the splice region 1 is, for example 15 mm.

As described before, the warp threads of the splice tape have an initial modulus which is lower than that of the cords 2, and a thermal shrinkage which is at most 3% of that of the cords 2 of the carcass.

The splice tape 5 in FIG. 2b is brought over the cuts 3 and 3' of the tire fabric so that edges 3 and 3' according to FIG. 2c are positioned fixed relative to each other and the indentation is not observable and not measurable.

In the embodiment of FIGS. 3a-3c the value of the indentation is less than 0.2 mm and it is obtainable with the overlapping of no more than two cords with the attachment of the splice tape 5.

FIG. 3b shows the splice region 1 with two overlapping cords 2, which are covered with the splice tape 5. A very insignificant, almost non-observable indentation 4 at cut edges 3, 3' results.

With reference to FIGS. 4-6, these figures show a testing and measuring device which is also a vulcanizing mold. This device includes a frame 6 and a cover 7. The cover 7 has a bore 8 for receiving connections 8'. Frame 6 is positioned on a bottom plate 10 which supports a carcass splice sample 9 during the embedding in rubber. Eventually the bottom plate 10 can be replaced for the expansion and the vulcanization of the carcass splice sample 9 with a dome-shaped bottom plate 10.

FIG. 5 shows the testing device in a reversed position with the bottom plate 10 removed and in the inflated condition. The rubberized and expanded carcass sample 9 is shown between frame 6 and cover 7 with bore 8.

FIG. 6 shows the vulcanized tire carcass splice sample 9 which is secured between frame 6 and cover 7, for example by bolts 11 and is under pressure of 2 to 3 bar. The splice tape 5 is shown on the inflated carcass splice sample 9.

For the testing of the indentations in the carcass splice, the sample 9 embedded in rubber (FIG. 4) is vulcanized in the vulcanizing mold at 160° C. and pressure 1 to 2 bar 15 or more minutes. As soon as the testing device is cooled the carcass splice sample 9 positioned between frame 6 and cover 7 is rigidly clamped by bolts 11 and filled, via connection 8', with pressure air or pressure liquid at the pressure for example 2 bar. In this fashion, splice indentations can be observed not only optically. The expansion of the cords 2 of the carcass can be determined also at various pressures at different temperatures with this device.

EXAMPLE

Splice-testing samples of 360×160 mm are produced from an industrially made and calendered tire cord fabrics of polyester dtex 1100×2, made of Z/S-cord 445/445 T/m and 110 cord ends/dm. The polyester cords have a 44N-elongation of 4.8% and a thermal shrinkage of 2.6% at 160° C. with a pretention of 0.1 cN/tex.

Nylon tapes of tire cord of dtex 940×2 with Z/S cord 472/472 T/m, with 2.3% thermal shrinkage at temperature 160° C. are utilized as splice tapes.

The following table shows variants of the method of the invention.

SPLICE WARPING WITH AND WITHOUT A SPLICE TAPE
Carcass cloth: Polyester dtex 1100 Z 445 × 2 S 445
and 110 cord ends per dm

| Carcass splice sample | Degree of overlapping at the splice | | Requirement at testing pressure 2 bar | |
| --- | --- | --- | --- | --- |
| | Number of overlapping warp threads | Splice tape (15 mm wide) | Splice indentation in mm | Optically observable indentation |
| Var. | | | | |
| 1 | 0 | yes | 0 | no |
| 2 | 2 | yes | ~0.1 | yes |
| 3 | 5 | no | ~0.5 | yes |
| 4 | 5 | yes | ~0.5 | yes |
| 5 | 10 | no | ~0.6 | yes |

As seen from the table the version without overlapping cords but with the splice tape gives neither a known optical effect nor a measured or scanned value of indentations. The splice region with overlapping of 2 cords and the splice tape results in just detectable indentation. All the splice edges with 5 or more overlapping warp threads with or without the splice tape result in non-permissible wall indentations.

The method according to the invention permits to avoid splice related sidewall indentation or keep it within allowable limits in air-inflated tires by very simple means. The utilization of the method of this invention is not limited to tires. Also the method is suitable for splices or seams of other articles filled with gas or liquid such as rubber boats, tents and water beds.

It will be understood that each of the elements described above, or two or more together, may also find a useful application in other types of methods for preventing wall indentations in the splice areas of tire carcasses differing from the types described.

While the invention has been illustrated and described as embodied in a method for preventing wall indentations in the splice aras of the tire carcasses, it is not intended to be limited to the details shown, since various modifications and structural changes may be made without departing in any way from the spirit of the present invention.

Without further analysis, the foregoing will so full reveal the gist of the present invention that other can, by applying current knowledge, readily adapt it various applications without omitting features that, from the standpoint of prior art, fairly constitute essential characteristics of the generic or specific aspect of this invention.

What is claimed as new and desired to be protected by Letters Patent is set forth in the appended claims.

I claim:

1. A method for preventing side wall indentations in a splice region of a tire carcass formed of calendered cords and having two cut edges extending parallel to the calendered cords, comprising the steps of joining together said two cut edges by a butt splice; and covering said butt splice by a splice tape which consists essentially of calendered nonintersecting warp threads extending at an angle from 0° to 90° to said calendered cords of the carcass, and having an initial modulus which is lower than that of said calendered cords, and a thermal shrinkage which is at most 3% of that of the carcass.

2. The method as defined in claim 1, wherein said cut edges of the carcass are in loose contact with each other in said splice region.

3. The method as defined in claim 1, wherein said tape is formed of parallel warp threads.

4. The method as defined in claim 3, wherein weft threads of said splice tape have an expansion in the region of weft threads of the carcass.

5. The method as defined in claim 1, wherein said splice tape has the width of at least 5 mm.

6. The method as defined in claim 1, wherein said splice tape is is made of polyamide single or plied thread.

7. A method of preventing detrimental side wall indentations in a splice region of a tire carcass formed of calendered cords and having two cut edges extending parallel to the calendered cords, comprising the steps of joining together said two cut edges by overlapping said edges at most five calendered cords of the carcass; and covering the overlapped region of the carcass by a splice tape which consists essentially of calendered nonintersecting warp threads extending at an angle from 0° to 90° to said calendered cords of the carcass, and having an initial modulus which is lower than that of said calendered cords, and a thermal shrinkage which is at most 3% of that of the carcass.

* * * * *